(No Model.)
L. M. THOMPSON.
DEVICE FOR PREPARING GREEN CORN.
No. 439,582. Patented Oct. 28, 1890.
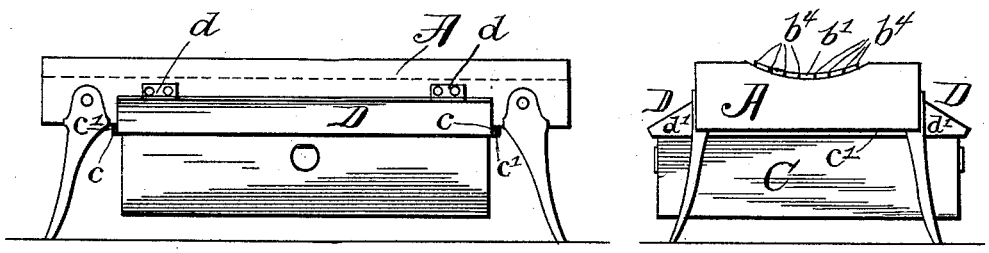
Fig. 1.   Fig. 2.
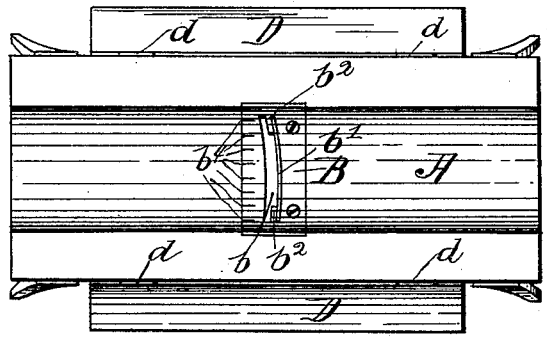
Fig. 3.
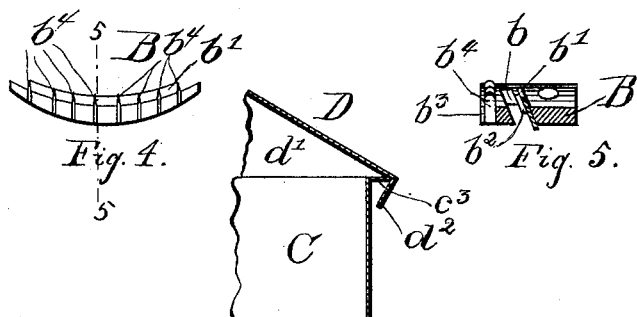
Fig. 4.   Fig. 5.
Fig. 6.
Witnesses
Luke F. Hayden
Inventor
Louisa M. Thompson
By her Attorney
Albert A. Wood

UNITED STATES PATENT OFFICE.

LOUISA MAY THOMPSON, OF ATLANTA, GEORGIA.

DEVICE FOR PREPARING GREEN CORN.

SPECIFICATION forming part of Letters Patent No. 439,582, dated October 28, 1890.

Application filed July 16, 1890. Serial No. 358,915. (No model.)

*To all whom it may concern:*

Be it known that I, LOUISA MAY THOMPSON, a citizen of the United States, and a resident of Atlanta, in the county of Fulton and State of Georgia, have invented certain new and useful Improvements in Devices for Preparing Green Corn; and I do hereby declare the following to be a full, clear, and exact description of the invention, such as will enable others skilled in the art to which it appertains to make and use the same, reference being had to the accompanying drawings, and to letters of reference marked thereon.

This invention relates to devices for kitchen use in preparing green corn, said preparation consisting in desiccating the same or removing the interior substance from the kernels and leaving the shell or covering of said kernel on the cob as refuse, the invention consisting of the construction and details hereinafter fully described, the parts claimed as new being specifically pointed out in the claims.

In the accompanying drawings, Figure 1 is a side elevation of the device, showing the bed and its supporting-legs and the pan and hinged covers. Fig. 2 is an end elevation thereof, further showing the fleam-shaped slitters and stripping-knife. Fig. 3 is a plan of the device, showing further the elements shown in the two figures just mentioned. Fig. 4 is an end elevation of the metal-throated seat for the knives, and Fig. 5 is a longitudinal vertical section of Fig. 4, showing the slitting-knives and stripper, the manner of seating them, the lip holding the stripper in place, and the throat through the plate. Fig. 6 is a detail showing the pan and one of the covers for the purpose of indicating their manner of engaging.

In the figures like reference-marks indicate corresponding parts in the several views.

The bed A is of hard wood, and is supported on legs $a$, and has a longitudinally-extending concavity in its top of sufficient diameter to correspond with the circumferential form of an ear of corn. In the center of this board A is a recess extending laterally thereof and entirely through the same, and seated over this throat or recess is a plate B, of metal, the top of which plate corresponding in curvature with the concavity in the top of the bed A. This plate B, as best shown in Figs. 3 and 5, is perforated by a throat $b$, and in this throat is seated the stripper $b'$, the lips $b^2$, extending from the ends of the throat $b$, being bent against said knife, thereby holding it in position. To enable these lips to be bent against said knife without breaking, the plate B should be of malleable iron or of wrought-iron. The stripper $b'$ should be set at a slight forward angle and the top be slightly beveled, so as to present its forward corner to the corn when said corn is passed over it, pressing the interior substance from the kernels and causing it to drop through the throat $b$. Seated in recesses $b^3$, preferably sawed in the edge of the plate, are the slitters $b^4$, which are made of flat pieces of steel, and are set, as just mentioned, in the recesses at a driven fit, projecting upwardly from the face of the plate B, which upward projection is fleam-shaped and presents a cutting-edge to the kernels of corn brought into contact therewith, the curved sharpened top of said knives preventing kernels from being torn out of the cob by being sharpened, and offering no resistance to the passage of the corn. These slitters will open each kernel of corn and allow the stripper to remove its pulpy substance, which having been previously cooked is now ready for use.

To afford a convenient receptacle for the product, a pan C, provided with outwardly-extending flanges $c$ on its sides, is provided, which said flanges C slide in guides $c'$, secured to the under side of the bed A, by means of which construction the draw may be removed, when desired. Hinged by hinges $d$ to the sides of the bed A, and adapted to be raised thereon at will, are the covers D, having ends $d'$ and an edge flange $d^2$, set at an acute angle to said covers preferably, which flange, when the covers are lowered, will engage with the flanges $c^3$ and the pan C and prevent its removal accidentally or otherwise until one of the covers D shall be lifted, and obviating in this manner all danger of any tilting of the device while in use, causing the pan to slide out and spill its contents.

Having thus described my invention, what I claim as new, and desire to secure by Letters Patent, is—

1. In a device of the class specified, the combination of the bed A, having a circular recess extending longitudinally of the same, and a throat passing vertically through its central part, the plate B, seated in said recess and having a throat registering with that of the base, the stripper $b'$, mounted in the throat of said plate and securely held therein by the lips $b^2$, and the slitters $b^4$, seated in recesses in the bed and passing through slits in the end of the plate B, substantially as and for the purpose specified.

2. In a device of the class specified, the bed A, having an aperture for the passage of the material, the pan C, sliding in guides under the said bed, and the cover D, having flange $d^2$, adapted to normally engage with the upper part of a side of the said pan, preventing withdrawal of said pan, and means for limiting its motion in the opposite direction, for the purpose specified.

In testimony whereof I hereunto affix my signature in presence of two witnesses.

LOUISA MAY THOMPSON.

Witnesses:
A. P. WOOD,
S. M. WOOD.